United States Patent [19]

Komma et al.

[11] Patent Number: 4,602,967

[45] Date of Patent: Jul. 29, 1986

[54] METHOD AND APPARATUS FOR THERMAL LONGITUDINAL PARTING OF RECTANGULAR METAL PLATE BARS, IN PARTICULAR OF CUT-TO-LENGTH CONTINUOUS-CASTING PLATE SLABS

[75] Inventors: Gerhard Komma, Dinslaken; Dietmar Lohse, Wesel, both of Fed. Rep. of Germany

[73] Assignee: Mannesmann Demag AG, Dusseldorf, Fed. Rep. of Germany

[21] Appl. No.: 159,583

[22] Filed: Jun. 16, 1980

[30] Foreign Application Priority Data

Jun. 16, 1979 [DE] Fed. Rep. of Germany ....... 2924365

[51] Int. Cl.⁴ .............................................. B23K 7/00
[52] U.S. Cl. ..................................... 148/9 R; 266/44
[58] Field of Search .......................... 148/9 R, 9.5, 9.6; 266/44, 49, 50

[56] References Cited

U.S. PATENT DOCUMENTS

| | | | |
|---|---|---|---|
| 3,743,260 | 7/1973 | Alleman et al. | 148/9 R |
| 4,143,860 | 3/1979 | Herbener et al. | 266/49 |
| 4,143,861 | 3/1979 | Anderson | 266/49 |
| 4,208,039 | 6/1980 | Höffken et al. | 266/50 |
| 4,266,989 | 5/1981 | Ludwigson | 148/9 R |
| 4,281,822 | 8/1981 | Möller | 266/50 |

FOREIGN PATENT DOCUMENTS 2710564  4/1978  Fed. Rep. of Germany .

*Primary Examiner*—John P. Sheehan
*Attorney, Agent, or Firm*—Mandeville and Schweitzer

[57] ABSTRACT

The invention is directed to a method and apparatus for thermally cutting rectangular metal slabs along a longitudinal axis of the slab. A metal slab is conveyed along a predetermined path of travel while it is being cut by, for example, an oxygen-flame cutting machine. The means for conveying the metal slab comprises a plurality of rollers transversely disposed relative to the path of travel and the cutting machine is arranged above the conveying means and between two of the rollers. The slag created by the cutting is collected and conveyed by a slag duct disposed below the conveying means. Pursuant to the invention, the slag duct extends from between the two rollers adjacent the cutting machine along an axis transverse to the path of travel. In accordance with another feature of the invention, the side edges of the metal slab are sensed and the cutting machine is transversely aligned relative to the path of travel in accordance with the sensed locations of the side edges.

2 Claims, 5 Drawing Figures

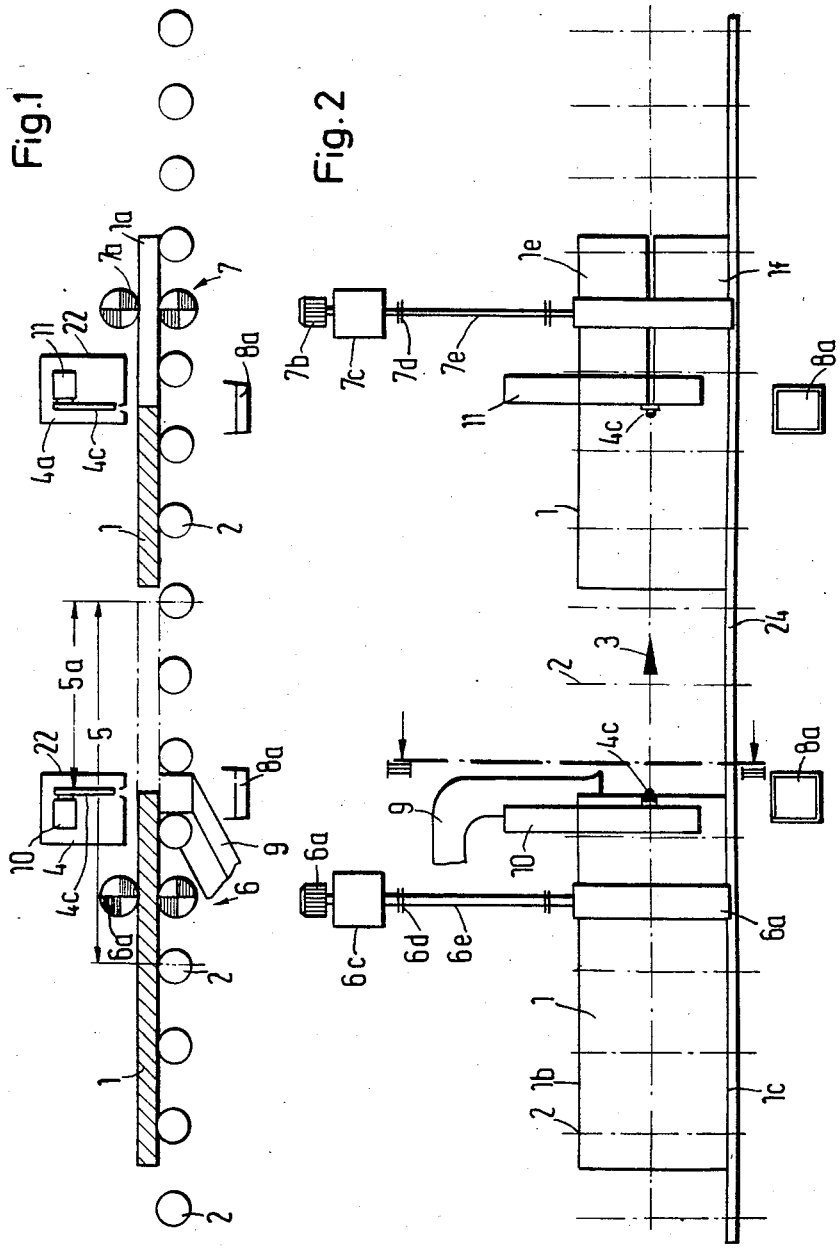

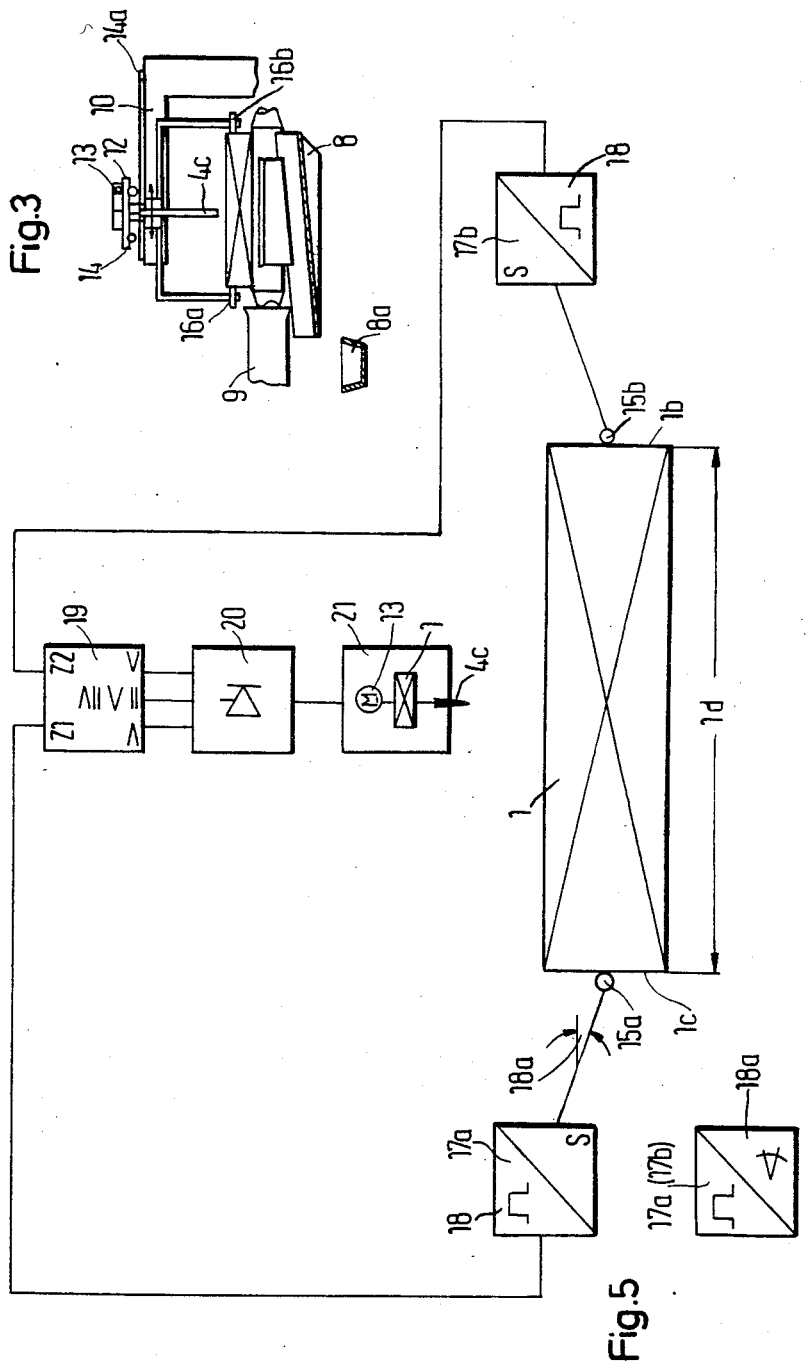

METHOD AND APPARATUS FOR THERMAL LONGITUDINAL PARTING OF RECTANGULAR METAL PLATE BARS, IN PARTICULAR OF CUT-TO-LENGTH CONTINUOUS-CASTING PLATE SLABS

BACKGROUND AND SUMMARY OF THE INVENTION

The invention concerns a method and an apparatus which is especially advantageous for its performance in the thermal longitudinal parting of rectangular metal plates, in particular of cut-to-length continuous casting plate slabs while the metal plates rest on supports which run crosswise to the longitudinal direction of the parting. In the cross-parting of steel, cast as a continuous slab, or of NE-metals, the thermal separation on the basis of oxygen-flame cutting or plasma-flame cutting serves the preparation for the rolling which follows, whereby the cross-parting determines the length of, for instance, the coil weight of the tin sheeting to be rolled. Compared with that, the conditions, when parting metal slabs longitudinally, present themselves differently because in the latter case the desired width of the tin sheeting to be rolled out is determined. In recent years the aim was to increase the production rate in continuous casting through increasing the batch weights and through larger slab widths. Wider slabs do allow for a more economical production of casting products under maximal exploitation of the slab-casting apparatus. However, the wider slabs must be reduced to the existing first-pass cross sections of the rolling mills, the width dimensions of which in turn go necessarily by the widths of the tin sheeting which are required in the subsequent procedure.

It is well-known (DE-AS No. 27 10 564) how, in order to fulfill this requirement, to move the cutting arc relative to the plate slab when parting crosswise, in which case, according to this suggestion vis-a-vis parting lengthwise the only difference is that the plate slab is at rest. The well-known longitudinal parting procedure requires, however, special steps for the protection of the supports which pass in crosswise direction to the longitudinal parting direction. Therefore, a diversified formation is required of the existing supports which go crosswise to the longitudinal parting direction. At first, longitudinally driven rolls cause the transportation of the plate slabs. These rolls must be able to swing out in order not to be destroyed during the flame cutting. Further, crosswise-passing rigid plate slabs are provided which have to have so-called burn point openings for the path of the cutting arc. The burn point openings which are arranged in the path of the cutting arc result in a slit-like burn canal, the length of which corresponds to the length of the plate slabs, for instance 8 m and more, turns out to be very extended. A further disadvantage is that the slag and an increased amount of gas must be carried away from the long burn canal. Besides, the burning canal is firmly built-in and does not allow for any adjustment to changing the widths of the plate slabs to be parted longitudinally.

The invention is based on the task to simplify the known method, and based on that to create a better protected apparatus with less expenditure.

This task is solved in accordance with the invention by moving the metal slabs in longitudinal parting direction vis-a-vis the cutting arc which is motionless in the longitudinal parting direction and which is in a given case movable crosswise to the longitudinal parting direction only because of corrections in width conditional on deviations in width or through skewed position of the metal slabs, and by carrying off between two supports the slag collected at some point crosswise to the longitudinal parting direction between two supports. This proposal follows neither the principle of crosswise parting, in which case the continuously cast slab is moved by the pouring velocity which is followed by the cutting arc, nor does it follow the known principle where the continuous-cast plate slab is at rest. Consequently, it is advantageous that neither swing-away support rolls nor a relatively long burn-canal are necessary but that a burn-canal results naturally between the two existing support rolls. Accordingly, the burn-canal is short and the collected burn slag may be removed via a short passage. Furthermore, there is a resultant decrease in the volume of gas-exhaust and accordingly less power for the drive of the gas-exhaust. Another advantage of the invention lies in the fact that heavy crosswise-slidable slab centering machines are avoided, which are replaced by control arrangements which move the much lighter cutting arc installations. A further advantage lies in the possibility of changing the width-program without displacing the burn-point openings, i.e., to insert partings of ½, ⅓, ¼ and the like for short runs.

An increased cutting performance may now be achieved after a further improvement of the invention, in that at least two metal slabs are moved relative to motionless cutting arcs which are at any given time spaced in the longitudinal parting direction. The doubling of the cutting capacity leads to an increased yield in cut goods and to an increased performance in comparison with cutting machines which run counter and thereby necessarily impede each other on encounter.

The performance of longitudinal parting is increased by an additional proposal in method when at a given time a metal slab is being cut only partially in the longitudinal direction, the cutting arc switched off afterwards, and this same metal slab is completely parted under a cutting arc which is pre-positioned in the longitudinal parting direction at a distance of more than the length of a slab, while the following metal slab is again parted, in longitudinal direction, only partially with the cutting arc again switched on.

The apparatus for the application of the invented method is designed in such a way that a cutting arc is provided between two rigidly arranged roller-bed rolls supporting the metal slabs along their full width. The cutting machine is motionless in the longitudinal parting direction and may be adjusted crosswise to the longitudinal parting direction. A pair of driving rolls are mounted adjacent the cutting machine. A conveyor duct for the resultant slag is provided, arranged crosswise to the longitudinal parting direction under the cutting machine, and a gas-exhaust pipe is connected to the conveyor duct. No swing-away rolls or additional supports are needed. The cutting machine, which is only movable crosswise, needs simpler electric conductors and conductors for the means of cutting. In view of the width of the slab, the conveyor duct has relatively short dimensions and requires a smaller intake of energy. The exhauster performance of the gas-exhaust pipe is also less.

The transport of the uncut metal slabs, as well as the pieces cut and longitudinally parted, causes no problem, in that two cutting machines are tandem-joined, with a distance between the longitudinal parting direction at least as large as the maximal length of a metal slab.

A pair of driving rolls is positioned in front of the first cutting machine and a second pair of driving rolls is positioned behind the second cutting machine in longitudinal parting direction. The distance between the first cutting machine and its respective pair of driving rolls is at any time smaller than the uncut length of a minimal metal slab length while the distance between the second cutting machine and its respective pair of driving rolls is smaller than the cut length of a minimal slab after leaving the first cutting machine.

The crosswise movability required for the lateral corrections of the cutting machine may be used for an additional function, in that the cutting machine is adjustable crosswise to the longitudinal parting direction to provide for various parting widths of the cut slabs.

In addition, the short length of the slag conveyor path advantageously permits the conveyor duct to consist of a vibrating chute. To allow for lateral correction, as well as adjustment for various parting widths, lateral tracing devices are provided for tracing the vertical slides of the metal slabs which determine their width. The cutting machine is arranged to be motionless in the longitudinal parting direction, and the control of the crosswise drive of the cutting arc is geared towards an even distribution of the deviations onto the width of the pieces parted longitudinally.

While the long cutting path on cutting machines which are moved in cutting (transverse) direction require increased input for sound containment, the invention permits the cutting machine, which is stationary in longitudinal parting direction, to be arranged in a soundproof casing corresponding to the size of the cutting machine. The invention also avoids movable attachments and provides a rigid striker bar on at least one side of the roller bed at the level of the metal plate bar thickness.

A high cutting performance is attained while using less space when several longitudinal parting paths are arranged parallel next to each other, connected via a device pulling in transversal direction.

An example embodiment is shown in the drawing and is described in more detail below.

BRIEF DESCRIPTION OF THE DRAWINGS

FIG. 1 is a center line vertical section through the longitudinal parting apparatus as invented.

FIG. 2 is a plan view according to FIG. 1.

FIG. 3 is a cross section through apparatus at lines III—III of FIG. 2.

FIG. 5 is a block (wiring) diagram of an electric control for the lateral tracing device.

DETAILED DESCRIPTION OF A PREFERRED EMBODIMENT

Figure 4:
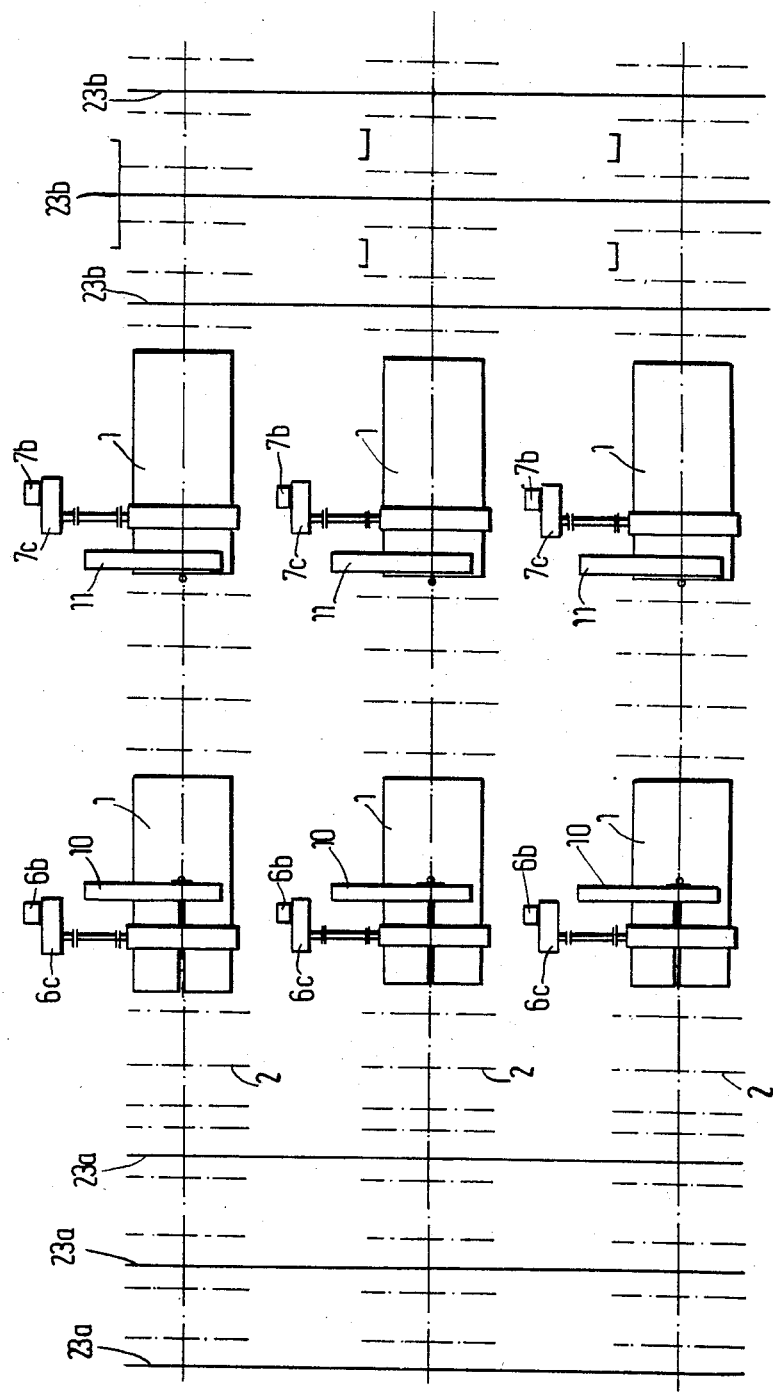
FIG. 4 is a plan view of a multiple arrangement of the longitudinal parting apparatus.

The metal slabs 1, on which the embodiment of the example is based, consist of continuous-casting plate slabs which are conveyed on the individually driven rolls 2 (which are shown in part symbolically by their center lines) of a roller bed into the range of the longitudinal parting apparatus. The respective (minimal or maximal) length of the metal slabs 1 is selected according to adaptability or to the length required for further processing.

The rollerbed rolls 2 are solidly arranged and form supports for the metal slabs 1, which extend crosswise to the longitudinal parting direction 3. A first cutting machine 4 is positioned between two rolls 2 of the roller bed. A further cutting machine 4a is provided, spaced in the longitudinal direction from the cutting machine 4, at a distance of a maximal metal slab length 5. Half the feed path 5a of the metal slab 1 is indicated in FIG. 1 by a dot-dash line, on which (path) the driving roll pair 6 with adjustable upper roll 6a advances the metal slabs one at a time vis-a-vis the cutting machine 4. At that phase another pair of driving rolls 7, with adjustable upper roll 7a pulls the already parted metal slabs 1a, to effect the remaining parting under the second cutting machine 4a. The driving roll pairs 6 and 7 are driven respectively by motors 6b, 7b, drive units 6c, 7c, couplings 6d, 7d and shafts 6e, 7e.

In the embodiment example, oxygen cutting arcs 4c are at a given time employed for the cutting machines 4 and 4a. The slag resulting during the cutting process drops into a conveyor duct 8 underneath which is a container 8a. Fumes and gases from burn cutting are removed by suction through a gas-exhaust pipe 9.

The respective cutting machines 4 and 4a are positioned at frames 10 respectively 11, and may be slid crosswise in not further detailed ways (FIG. 3). The cross drive machine 12 consists, as drawn, of a transportable vehicle with a drive motor 13. The vehicle is supported above wheels 14 on tracks 14a. On the axles of the wheels 14 are, for instance, sprockets which catch a toothed rack which passes parallel to the tracks 14a, which rack itself is firmly connected with frame 10 respectively 11.

The control of the cross drive machine 12 is executed according to the block (wiring) diagram according to FIG. 5. At the vertical areas 1b, 1c which limit the width 1d of the metal plate bars 1 continuously cling lateral tracing devices 15a, 15b which, as shown in FIG. 3, are executed as rolls 16a, 16b. The motions of the lateral tracing devices 15a, 15b are measured through motion pickups 17a, 17b and converted into an electrical signal of, for instance, rectangular shape. A measuring method dependent on angle 18a may also be employed. After comparing the two signals in the comparator 19 it is established which of the two signals is larger/smaller, whereupon the difference is at a time apportioned to the narrower longitudinally-parted piece(s) 1e, 1f (FIG. 2) so that continuously equally wide pieces 1e, 1f result. Here, the signals from comparator 19 are transmitted to regulator 20, which in turn affects regulator drive 21 consisting of, inter alia, the drive motor 13.

The respective cutting machines 4, 4a carry a sound isolation 22 (FIG. 1), in order to render the apparatus environmentally sound during use of oxygen-cutting arcs. The longitudinal parting apparatus, as invented, is arranged laterally next to the slab path of a continuous casting plant. The performance capability of the longitudinal parting apparatus is increased through parallel arrangement of several roller beds which are connected with each other by devices 23a, 23b pulling in transversal direction.

This arrangement also saves area (space). The arriving metal slabs 1 may be put on the roller bed which is at the time more favorable by means of the transverse pullers 23a, 23b or by means of a crane, and a rough alignment with the rigid striker bar 24 suffices to localize the operational range of the lateral tracing devices 15a, 15b.

I claim:

1. A method for thermally parting rectangular metal slabs, comprising the steps of
   (a) displacing a rectangular metal slab along a path of travel,
   (b) arranging two cutting arcs above said path of travel in longitudinally spaced relation along said path of travel,
   (c) sensing the locations of the outer side edges of said slab,
   (d) selectively displacing said cutting arcs along a path transverse to said path of travel of the metal slab in accordance with a predetermined relation to the sensed locations of said outer edges,
   (e) after the selective displacement of the cutting arcs, partially cutting said slab lengthwise with one of said cutting arcs, and
   (f) cutting the remaining length of said slab with the other of said cutting arcs.

2. The method according to claim 1, further characterized by
   (a) spacing said two cutting arcs from each other at least the length of said slab.

* * * * *